H. E. BLANCHARD.
SPIRAL BROACHING MACHINE.
APPLICATION FILED NOV. 21, 1917.
1,335,871. Patented Apr. 6, 1920.
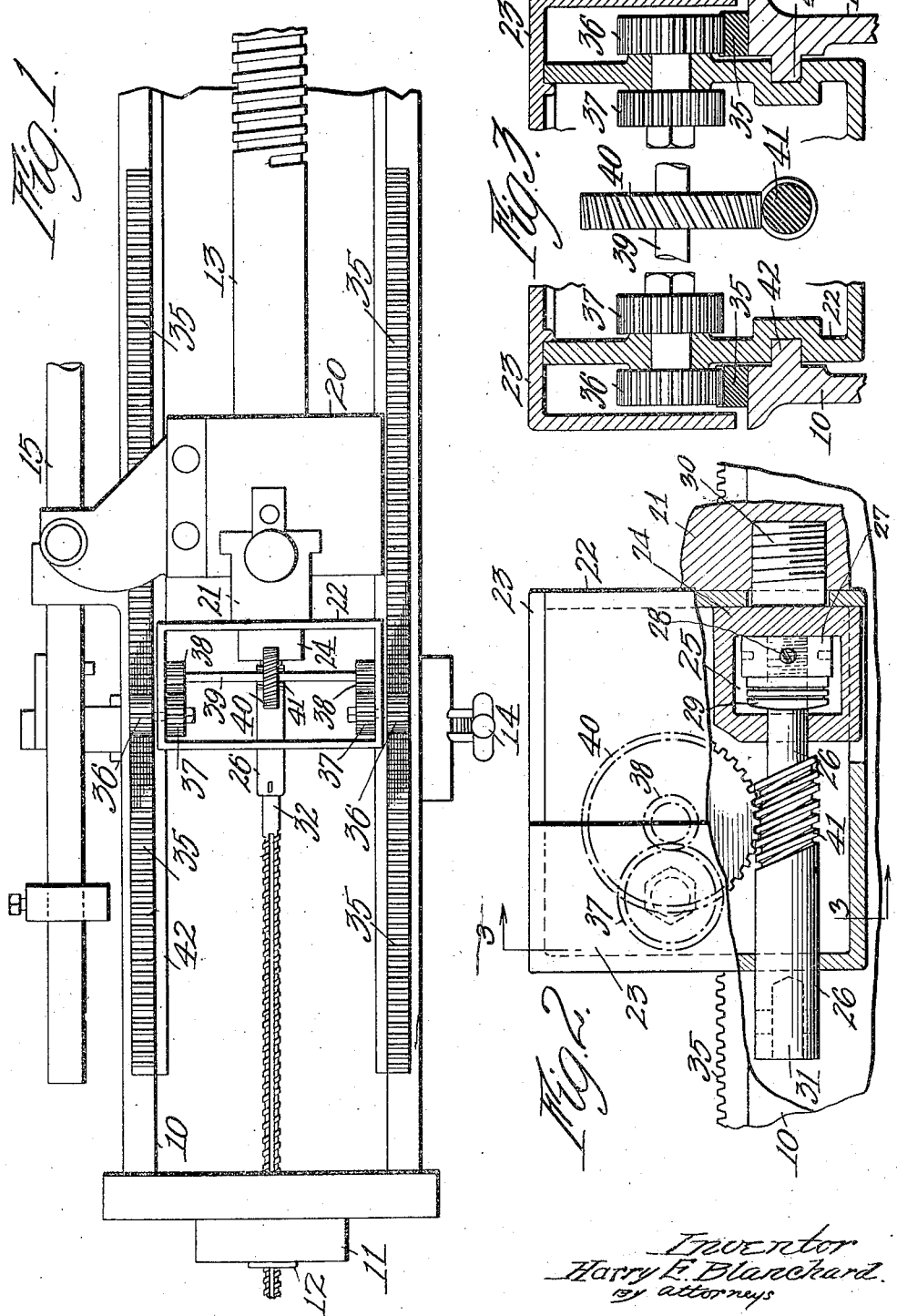

UNITED STATES PATENT OFFICE.

HARRY E. BLANCHARD, OF HUDSON, MASSACHUSETTS, ASSIGNOR TO LAPOINTE MACHINE TOOL COMPANY, A CORPORATION OF MAINE.

SPIRAL BROACHING-MACHINE.

1,335,871.  Specification of Letters Patent.  Patented Apr. 6, 1920.

Application filed November 21, 1917. Serial No. 203,080.

*To all whom it may concern:*

Be it known that I, HARRY E. BLANCHARD, a citizen of the United States, residing at Hudson, in the county of Middlesex and State of Massachusetts, have invented a new and useful Spiral Broaching-Machine, of which the following is a specification.

This invention relates to a machine for internal broaching particularly, and for producing a spiral or helical formation on the interior of the article to be acted upon.

The principal object of the invention is to provide a construction for this purpose in which the rotation of the broach will be provided for by external means, that is means independent of the broach itself, so that the broach will not have to be guided by a thread or the like formed upon itself, thus reducing the friction and increasing the life both of the broach and of the machine, and permitting of a higher speed of operation than in the old type of machine. This also permits of the making of cuts at a more acute angle than heretofore. It relates to that type of broaching machine in which the broach itself reciprocates through a stationary piece of work.

Further objects and advantages of the invention will appear hereinafter.

Reference is to be had to the accompanying drawings, in which—

Figure 1 is a plan of a part of a broaching machine constructed in accordance with this invention;

Fig. 2 is a side elevation of a portion thereof on enlarged scale, and

Fig. 3 is a sectional view on the line 3—3 of Fig. 2, partly broken away.

The machine is shown as provided with a stationary bed 10 which has a holder 11 in which the work 12 is held in stationary position. The means for clamping the work in place is not shown as any usual means can be employed for that purpose. By mechanism not shown herein, an operating member 13, as for example a screw, is reciprocated longitudinally. The means for reciprocating it is not part of this invention, and any desired means can be employed, as for example that shown in my companion case filed on even date herewith on a broaching machine, Serial No. 203,079. I have indicated a hand lever 14 and a shift rod 15 for controlling the operation of that mechanism, but these parts are not shown in full and their connections are not illustrated.

The screw 13 has fixed to its end a slide 20 on which is mounted a vertically adjustable head 21 having secured to it a frame 22 sliding on opposite ways 42. This frame is provided with a cover 23 shown in Figs. 2 and 3 only, and also fixed on it by means of a screw 30 is a block 24 which has in it a recess 25. Into this recess passes a spindle 26 having a nut 27 on its inner end positively fixed to it if desired by a screw 28.

Between this nut and the inside of the recess are collars 29 for spacing it properly. This spindle is free to turn but not to move longitudinally in the block. The spindle 26 is provided with a socket 31 for receiving the cutting tool or broach 32 which is pinned in position and thus is supported at this end by the spindle 26, the other end being supported by the work.

On the stationary frame are two longitudinal racks 35. The frame 22 supports two shafts on which are pinions 36 meshing with the two racks. On the inner side of this frame are gears 37 each of course rotating with its corresponding gear 36, and these meshing with gears 38 on a shaft 39 supported by the frame 22. On this shaft 39 is a quick pitch worm gear 40 which meshes with a worm 41 on the spindle 26 and rotates the same.

The operation will be obvious. As the slide 20 moves longitudinally the pinions 36 run on the racks 35 and rotate the broach 32 so as to give a spiral or helical form to the cut.

From this it will be seen that the rotative motion of the broach, instead of being caused as usual by running a thread on the broach through what is substantially a guide nut, is caused by means of the rack and pinion arrangement thus reducing the friction and wear very materially and leaving the broach to wear out by its ordinary cutting action alone so that no wear on the turning elements will render the broach unfit for use. This is an improvement over that type of machine in which the broach has to be guided by such a thread and consequently turned by it. Furthermore the machine can be used for cutting threads at a much more acute angle than has been the case heretofore on account of this different method of rotating the broach. By the old methods the angle of the cut was distinctly limited.

Although I have illustrated and described only a single form of the invention, I am aware of the fact that many modifications can be made therein by any person skilled in the art without departing from the scope of the invention as expressed in the claims.

Therefore I do not wish to be limited to all the details of construction herein shown and described, but what I do claim is—

1. In a broaching machine, the combination with a reciprocatory slide and means thereon for rotatably carrying a broach, of a stationary rack extending in the direction of reciprocation of said slide, and a pinion movable with the slide and coacting with said rack to be operated thereby and connected with said broach holding means for turning the broach as the slide reciprocates.

2. In a broaching machine, the combination with a reciprocating slide, and means thereon for rotatably carrying a broach, of a stationary rack, a pinion movable with the slide and meshing with the rack, and gearing movable with the slide and connected with said pinion and with the broach holding means for turning the broach as the slide reciprocates.

3. In a broaching machine, the combination of a reciprocating slide, a broach holder swiveled on said slide for holding one end of a broach, stationary means for holding the work and supporting the other end of the broach, a stationary rack, a frame fixed to said slide, a pinion carried by said frame and meshing with the rack, a shaft on said slide adapted to be turned by the pinion, and means on said shaft and connected with said holder for turning the broach as the slide reciprocates.

In testimony whereof I have hereunto affixed my signature.

HARRY E. BLANCHARD.